United States Patent
Thelin et al.

(10) Patent No.: US 9,959,014 B2
(45) Date of Patent: May 1, 2018

(54) SYSTEMS, COMMUNICATION ENDPOINTS, AND RELATED METHODS FOR DISTRIBUTING IMAGES CORRESPONDING TO COMMUNICATION ENDPOINTS

(71) Applicant: SORENSON IP HOLDINGS, LLC, Salt Lake City, UT (US)

(72) Inventors: Brett Thelin, Herriman, UT (US); Lane Walters, American Fork, UT (US); Tara Lalor, Salt Lake City, UT (US); James Blackham, Salt Lake City, UT (US); Kevin Selman, Salt Lake City, UT (US); Cameron Dadgari, Salt Lake City, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 0 days. days.

(21) Appl. No.: 15/345,325

(22) Filed: Nov. 7, 2016

(65) Prior Publication Data
US 2017/0052661 A1    Feb. 23, 2017

Related U.S. Application Data

(62) Division of application No. 14/539,961, filed on Nov. 12, 2014, now Pat. No. 9,491,258.

(51) Int. Cl.
*G06F 21/00* (2013.01)
*G06F 3/0482* (2013.01)
(Continued)

(52) U.S. Cl.
CPC ............ *G06F 3/0482* (2013.01); *G06F 21/60* (2013.01); *H04L 61/1594* (2013.01);
(Continued)

(58) Field of Classification Search
CPC .......... G06F 21/31; G06F 21/30; G06F 21/60; G06F 3/0428; H04L 63/101;
(Continued)

(56) References Cited

U.S. PATENT DOCUMENTS

| 8,413,059 B2 * | 4/2013 | Lee | G06Q 10/107 |
| | | | 709/206 |
| 8,521,824 B2 | 8/2013 | Baransky et al. | |

(Continued)

FOREIGN PATENT DOCUMENTS

| WO | 2007015184 A2 | 2/2007 |
| WO | 2008082204 A1 | 7/2008 |
| WO | 2013114212 A2 | 8/2013 |

*Primary Examiner* — Don Zhao
(74) *Attorney, Agent, or Firm* — TraskBritt

(57) ABSTRACT

Systems and methods are disclosed for distributing images corresponding to communication endpoints. A system includes one or more servers configured to determine whether image privacy settings corresponding to images of communication endpoints permit the images to be transmitted to others of the communication endpoints for display with contacts lists of the others of the communication endpoints. A method includes transmitting the data corresponding to the images to the others of the communication endpoints as permitted by the image privacy settings. A communication endpoint is configured to present a contacts list displaying the images corresponding to communication endpoints listed in the contacts list to a user, if permitted by the corresponding image privacy settings. A method of transforming a computing device into a communication endpoint includes storing computer-readable instructions directed to performing actions the communication endpoint is configured to perform, and transmitting the computer-readable instructions to the computing device.

19 Claims, 10 Drawing Sheets

(51) Int. Cl.
*H04L 29/08* (2006.01)
*H04L 29/06* (2006.01)
*G06F 21/60* (2013.01)
*H04L 29/12* (2006.01)
*H04N 7/18* (2006.01)

(52) U.S. Cl.
CPC .......... *H04L 63/101* (2013.01); *H04L 63/102* (2013.01); *H04L 67/06* (2013.01); *H04L 67/32* (2013.01); *H04N 7/183* (2013.01)

(58) Field of Classification Search
CPC . H04L 63/102; H04L 63/104; H04L 63/0407; H04L 63/08; H04L 61/1594; H04L 67/06; H04L 67/32; H04W 4/008; H04W 12/06; H04N 7/183
See application file for complete search history.

(56) References Cited

U.S. PATENT DOCUMENTS

| | | | |
|---|---|---|---|
| 8,549,072 B2 | 10/2013 | Zhu et al. | |
| 8,631,084 B2 | 1/2014 | Garcia | |
| 8,682,988 B2 | 3/2014 | Du | |
| 8,731,055 B2 | 5/2014 | Lee et al. | |
| 8,738,719 B2 | 5/2014 | Lee et al. | |
| 8,745,136 B1* | 6/2014 | Morrison | H04L 63/104 |
| | | | 705/319 |
| 8,752,186 B2 | 6/2014 | Vernal et al. | |
| 8,792,874 B2 | 7/2014 | Bluvband et al. | |
| 8,805,426 B2 | 8/2014 | Brown et al. | |
| 8,826,446 B1 | 9/2014 | Liu et al. | |
| 9,027,105 B1 | 5/2015 | Saylor | |
| 2002/0149705 A1* | 10/2002 | Allen | H04N 7/17318 |
| | | | 348/734 |
| 2010/0260191 A1* | 10/2010 | Hiie | H04L 12/1827 |
| | | | 370/400 |
| 2011/0004922 A1 | 1/2011 | Bono et al. | |
| 2012/0087367 A1 | 4/2012 | Anikin et al. | |
| 2012/0151601 A1 | 6/2012 | Inami et al. | |
| 2012/0196580 A1* | 8/2012 | Simmons | H04M 1/57 |
| | | | 455/415 |
| 2012/0290979 A1* | 11/2012 | Devecka | H04W 4/206 |
| | | | 715/810 |
| 2012/0303652 A1* | 11/2012 | Tseng | G06Q 30/02 |
| | | | 707/769 |
| 2012/0304265 A1 | 11/2012 | Richter et al. | |
| 2013/0156274 A1 | 6/2013 | Buchmueller et al. | |
| 2013/0247151 A1* | 9/2013 | Barrett-Bowen | H04L 63/104 |
| | | | 726/4 |
| 2014/0041056 A1 | 2/2014 | Stoop et al. | |
| 2014/0164517 A1 | 6/2014 | Valdetaro | |
| 2014/0188991 A1* | 7/2014 | Dhara | H04L 67/306 |
| | | | 709/204 |
| 2014/0196157 A1 | 7/2014 | Callahan et al. | |
| 2014/0212112 A1* | 7/2014 | Haff | G11B 27/02 |
| | | | 386/286 |
| 2014/0237618 A1 | 8/2014 | Vernal et al. | |
| 2014/0282041 A1* | 9/2014 | Walker | G06F 3/0484 |
| | | | 715/739 |
| 2015/0101022 A1* | 4/2015 | Zent | G06F 21/31 |
| | | | 726/4 |
| 2015/0149179 A1* | 5/2015 | Korbecki | G10L 13/00 |
| | | | 704/260 |
| 2015/0149930 A1 | 5/2015 | Walkin et al. | |
| 2017/0201575 A1* | 7/2017 | Song | H04L 67/1059 |

* cited by examiner

SYSTEMS, COMMUNICATION ENDPOINTS, AND RELATED METHODS FOR DISTRIBUTING IMAGES CORRESPONDING TO COMMUNICATION ENDPOINTS

CROSS-REFERENCE TO RELATED APPLICATION

This application is a divisional of co-pending U.S. patent application Ser. No. 14/539,961, filed Nov. 12, 2014, U.S. Pat. No. 9,491,258 (Nov. 8, 2016), the disclosure of which is hereby incorporated herein in its entirety by this reference.

TECHNICAL FIELD

The disclosure relates to distributing images corresponding to communication endpoints. More specifically, the disclosure relates to distributing images corresponding to user accounts associated with communication endpoints for audibly impaired users for display in contacts lists of the communication endpoints.

BACKGROUND

Communication systems for audibly impaired individuals (e.g., individuals with hearing impairments, speech impairments, or a combination thereof) enable non-audible communications. For example, some such communication systems enable audibly impaired individuals to communicate using communication endpoints (e.g., video endpoints, text endpoints, etc.) configured to transmit and receive non-audible communications (e.g., video, text, etc.).

These communication endpoints are sometimes registered with entities that provide services for audibly impaired users (e.g., communication session enabling services, user account information databases, audible to non-audible communication translation, etc.). There is a need to provide audibly impaired users of communication endpoints and servers for the audibly impaired greater control and privacy.

BRIEF SUMMARY

In some embodiments, the disclosure comprises a communication system. The communication system includes one or more servers configured to communicate with communication endpoints. The communication endpoints are configured to engage in communication sessions for audibly impaired users with each other. The one or more servers include a data storage device configured to store contact data and image data for each one of the communication endpoints. The contact data includes a contacts list for each one of the communication endpoints. The image data includes an image for each one of the communication endpoints, and an image privacy setting for the image of each one of the communication endpoints. The image privacy setting indicates which of the communication endpoints may be transmitted the corresponding image for display with contacts lists of the communication endpoints. The one or more servers may also include control circuitry configured to determine, for each contact corresponding to one of the communication endpoints in each contacts list, whether the image privacy setting for the corresponding image permits distribution of the image to the communication endpoint corresponding to the contacts list for display with the contacts list. The control circuitry is also configured to transmit the image to the communication endpoint corresponding to the contacts list if it is determined that the image privacy setting permits.

In some embodiments, the disclosure comprises a method of operating one or more servers. The method comprises storing user account data in a data storage device of the one or more servers. The user account data corresponds to user accounts for audibly impaired users of communication endpoints. The user account data includes data corresponding to contacts lists. Each one of the contacts lists corresponds to one of the user accounts and includes contact information for contacting others of the communication endpoints. The user account data also includes images. Each one of the images corresponds to one of the user accounts. Each one of the images has one of a plurality of image privacy settings associated therewith. Each of the plurality of image privacy settings define conditions whereby the images may be distributed to the communication endpoints to enable the communication endpoints to display the images that correspond to contacts listed in their contacts lists. The method also includes transmitting the data corresponding to the images to the communication endpoints, as permitted by ones of the plurality of image privacy settings that are associated therewith.

In some embodiments, the disclosure comprises a communication endpoint. The communication endpoint includes one or more communication elements configured to enable the communication endpoint to communicate with a plurality of other communication endpoints and one or more servers. Each of the communication endpoint and the plurality of other communication endpoints have an image and a corresponding image privacy setting associated therewith stored by the one or more servers. The communication endpoint also has a contacts list including a list of contacts corresponding to a subset of the plurality of other communication endpoints. The communication endpoint also includes control circuitry operably coupled to the one or more communication elements. The control circuitry is configured to enable the communication endpoint to engage in communication sessions for audibly impaired users with the plurality of other communication endpoints. The communication endpoint further includes a user interface operably coupled to the control circuitry. The control circuitry is further configured to cause the user interface to present the contacts list to a user of the communication endpoint. Each contact presented in the contacts list includes the image of the contact displayed in the contacts list if the one or more servers determine, based at least in part on the image privacy setting corresponding to the image, that the communication endpoint may present the image.

In some embodiments, the disclosure comprises a method of transforming a computing device into a communication endpoint. The method includes storing computer-readable instructions on one or more storage devices of a server configured to communicate with the computing device. The computer-readable instructions are directed to instructing the computing device to engage in communication sessions for audibly impaired users with a plurality of other images and corresponding image privacy settings associated therewith saved by at least one of the server and one or more other servers. The computer-readable instructions are also directed to instructing the computing device to present a contacts list to a user of the computing device. Each contact presented in the contacts list corresponds to one of the plurality of other communication endpoints. The computer-readable instructions are further directed to instructing the computing device to display the images of the plurality of other communication endpoints that are listed in the contacts list with the contacts list if the corresponding image privacy settings permit. The method may also include transmitting the computer-readable instructions to the computing device.

DETAILED DESCRIPTION

Figure 1:
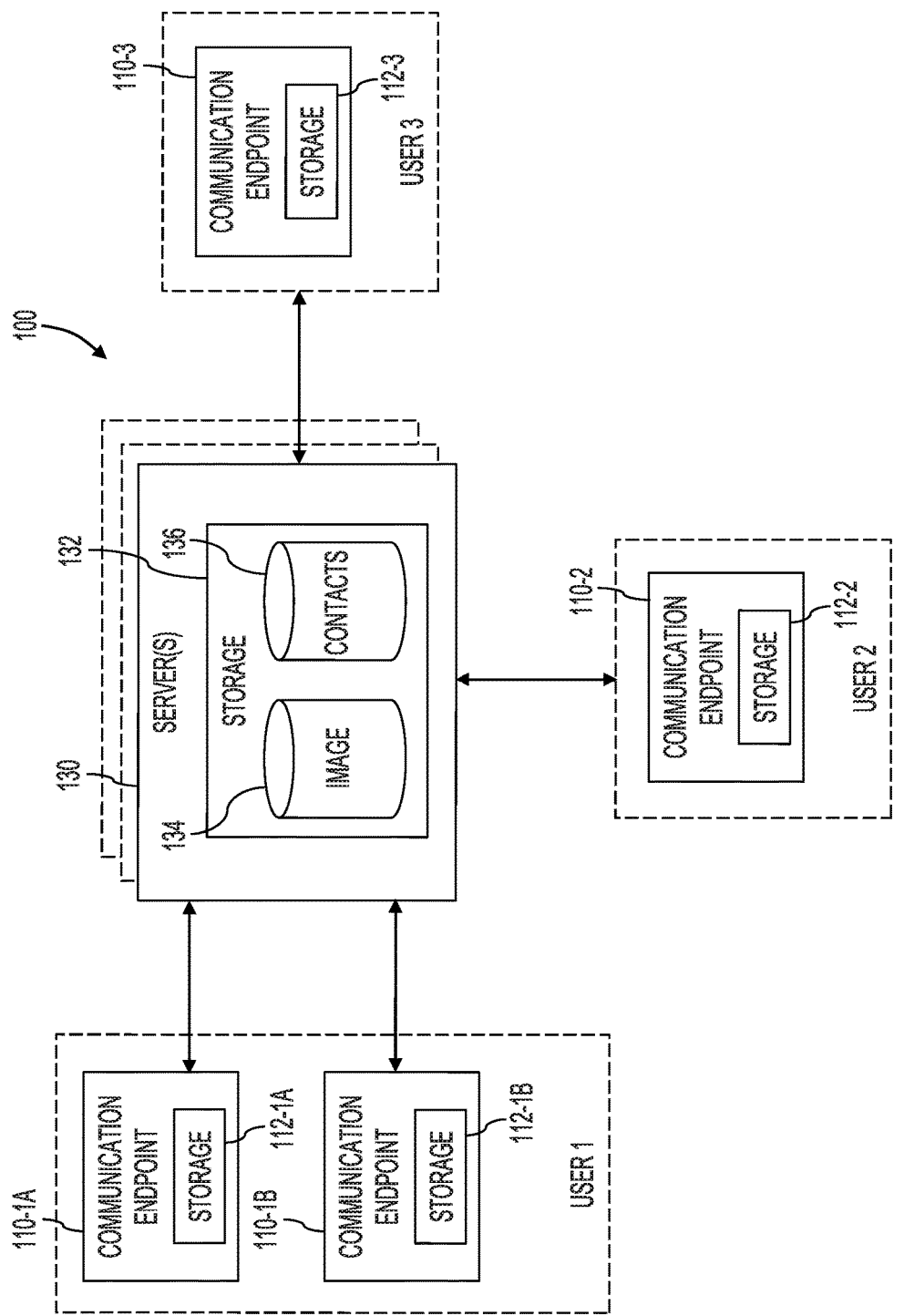
FIG. 1 is a simplified block diagram of a communication system for audibly impaired users.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor may be a microprocessor, but in the alternative, the processor may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration.

A processor may be part of a computer, which should be considered a special purpose computer when configured to execute instructions (e.g., software code) for carrying out embodiments of the disclosure. Moreover, when configured according to embodiments of the disclosure, such a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of distributing images to communication endpoints for audibly impaired people.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the disclosure include systems and methods for distributing images corresponding to communication endpoints. It should be noted that while the utility and application of the various embodiments of the disclosure are described herein with reference to communication systems for individuals having audible impairments (e.g., hearing impairments, speech impairments, and combinations thereof), the embodiments of the disclosure also include any environment where greater user control and flexibility for distributing images corresponding to communication endpoints may be desirable.

FIG. 1 is a simplified block diagram of a communication system 100 for audibly impaired users. The communication system 100 may include one or more servers 130 (sometimes referred to herein simply as "servers" 130) configured to communicate with communication endpoints 110-1A, 110-1B, 110-2, and 110-3 (sometimes referred to herein generically together as "communication endpoints" 110, and individually as "communication endpoint" 110). The communication endpoints 110 may include communication devices for audibly impaired users (e.g., video endpoints, text communication devices, etc.). Accordingly, the communication endpoints 110 may be configured to enable audibly impaired users to participate in non-audible communications with each other using the communication endpoints 110.

As illustrated in FIG. 1, the communication endpoints may be configured for use by various audibly impaired users. By way of non-limiting example, the communication endpoints 110-1A and 110-1B may both be used by USER 1 (e.g., a home video phone and a cellular video endpoint of the same user), communication endpoint 110-2 may be used by USER 2, and communication endpoint 110-3 may be used by USER 3. It should be understood that the communication endpoints 110 may each be configured for use by more than one user in some embodiments. By way of non-limiting example, communication endpoint 110-2 may be a home video phone shared by USER 2 and USER 2's family members.

In some embodiments, each of the communication endpoints 110 may have a user account associated therewith. Each of the user accounts may be associated with an image (e.g., a profile picture) and a contacts list (e.g., a list of others of the communication endpoints 110 and their corresponding contact information) associated therewith. In some embodiments, user accounts associated with communication endpoints 110 used by the same user may share the same image, contacts list, or combination thereof. By way of non-limiting example, communication endpoints 110-1A and 110-1B may share the same image and contacts list In some embodiments, user accounts associated with communication endpoints 110 used by the same user may have different images, contacts lists, or combinations thereof. By way of non-limiting example, communication endpoint 110-1A may be a home video phone shared by USER 1 and members of USER 1's family. The image associated with communication endpoint 110-1A may include a family photograph of USER 1 and the members of USER 1's family. Also, the contacts list associated with communication endpoint 110-1A may include contacts shared between USER 1 and the members of USER 1's family. Communication endpoint 110-1B may be USER 1's cellular video phone. The image associated with communication endpoint 110-1B may include an image of USER 1 only, without the members of USER 1's family. Also, the contacts list associated with communication endpoint 110-1B may be different from the contacts list associated with communication endpoint 110-1A.

The servers 130 may be configured to store information corresponding to each of the user accounts. For example, the servers 130 may include one or more storage devices 132 (also referred to herein simply as "storage" 132) configured to store data corresponding to the image and the contacts list of each communication endpoint 110. Accordingly, the storage 132 may be configured to store an image database 134 and a contacts database 136. The image database 134 may be configured to store data corresponding to the image associated with each communication endpoint 110. Similarly, the contacts database 136 may be configured to store data corresponding to the contacts list of each communication endpoint 110.

The communication endpoints 110 may be configured to present the contacts lists associated therewith to the users thereof. These contacts lists presented to the user may include the images corresponding to the communication endpoints 110 listed in the contacts lists, if the users of the communication endpoints 110 authorize their images to be presented in the contacts lists.

Each of the communication endpoints 110 may be configured to enable the users thereof to select between different image privacy settings for the image associated therewith. For example, the communication endpoints 110 may be configured to enable the users to select between a "share with everyone" setting (e.g., the image may be shared with each communication endpoint 110) and a "share only with my contacts" setting (e.g., the image may only be shared with communication endpoints that are listed in the contacts list of the communication endpoint 110 associated with the image). Other image privacy settings may also be available. For example, the communication endpoints 110 may be configured to also provide a "share with no one" setting (e.g., the image may not be shared with any other communication endpoint 110), an "ask for my permission" setting (e.g., users desiring to view the image in their contacts lists are first required to send a request for the user's permission to view the image in their contacts lists), other image privacy settings, and combinations thereof. In some embodiments, the communication endpoints 110 may be configured to block specific other users from viewing the image associated with their communication endpoints 110.

In some embodiments, each of the communication endpoints 110 may default to one of the different image privacy settings if the user has not made a selection of one of the different image privacy settings. As a non-limiting example, each of the communication endpoints 110 may default to the "share with everyone" setting. As another non-limiting example, each of the communication endpoints 110 may default to the "share only with my contacts" setting.

Each of the communication endpoints 110 may also be configured indicate which of the different image privacy settings is in effect (e.g., resulting from a user selection or a default selection) for the image associated therewith to the servers 130. The servers 130 may store the privacy setting for each image (e.g., in the image database 134). Accordingly, the servers 130 may be informed of the image privacy settings for each of the images in the image database 134.

The servers 130 may be configured to distribute the images from the image database 134 to the communication endpoints 110 for various purposes, subject to the image privacy settings that are in effect for the images. As previously discussed, each of the communication endpoints 110 may be configured to present the contacts list associated therewith to the user thereof, and the contacts list may be populated with, among other information, images (e.g., thumbnail or full-sized images) corresponding to the contacts (e.g., the communication endpoints 110) in the contacts list. Accordingly, the servers 130 may be configured to transmit the images corresponding to the contacts in each communication endpoint's 110 contacts list to the communication endpoint 110, if such transmittal is in accordance with the associated image privacy settings. In other words, the servers 130 may transmit each of the images having the "share with everyone" setting to each of the communication endpoints 110 having the associated communication endpoint 110 in their contacts lists. Also, the servers 110 may transmit each of the images having the "share only with my contacts" setting to only those of the communication endpoints 110 that have the associated communication endpoint 110 in their contacts lists, and that are in the associated communication endpoint's 110 contacts list. Furthermore, the servers 130 may not transmit any of the images having the "share with no one" setting to any of the communication endpoints 110.

In some embodiments the communication endpoints 110 may be configured to enable the user thereof to provide, change, and/or delete the image associated therewith. By way of non-limiting example, the communication endpoints 110 may be configured to enable the users to transfer data corresponding to images to the communication endpoints 110 from another device (e.g., a digital camera, a mass-storage device, a computing device, etc.) through electrical interfaces including, for example, a universal serial bus (USB) interface, a secure digital (SD) card interface, a BLUETOOTH® wireless interface, a WIFI™ interface (e.g., using an 802.11 protocol), a ZIGBEE® wireless interface, other electrical interfaces, and combinations thereof. Also by way of non-limiting example, some of the communication endpoints 110 may include image-capturing capabilities (e.g., a camera, a webcam, etc.). These communication endpoints 110 may enable the users thereof to capture images that may then be associated with the communication endpoints 110. These images may be transmitted to the servers 130 and stored in the image database 134.

In some embodiments, the users may be enabled to provide, change, and/or delete the images associated with their communication endpoints 110 using a device separate from their communication endpoints 110. For example, a web interface may be provided to enable users to access the image database 134 from personal computing devices (e.g., a personal desktop or laptop computer, a tablet, a smartphone, a personal digital assistant, etc.). Images may be uploaded directly to the image database 134 from these personal computing devices. It is also contemplated that the users may edit their contacts lists in the contacts database 136 and their image privacy settings in a similar manner using similar devices.

The communication endpoints 110 may each include their own data storage devices 112-1A, 112-1B, 112-2, 112-3 (sometimes referred to herein generically together or individually as "storage" 112) for storing, among other things, data corresponding to their associated images and image privacy settings. The communication endpoints 110 may each be configured to also store the contacts lists associated therewith in the storage 112, along with the images associated with the communication endpoints 110 in the contacts list, if the corresponding image privacy settings permit (e.g., if the servers 130 transmitted the images to the communication endpoints 110 according to the image privacy settings).

The communication endpoints 110 may further be configured to enable the users thereof to modify the contacts lists associated therewith (e.g., add contacts, edit contacts, remove contacts, etc.). These modifications, as well as additions, changes, or deletions of the images, and/or changes to the respective image privacy settings, may be stored in the storage 112 of the communication endpoints 110. Also, in order for the image database 134 and the contacts database 136 to stay current, the modifications to the contacts lists, images, and the image privacy settings may be transmitted to the servers 130, and the appropriate one of the image database 134 and the contacts database 136 may be updated to reflect the modifications.

The servers 130 and the communication endpoints 110 may enter communication with each other to keep each other updated. This communication may be referred to herein as a "data exchange." Data exchanges may be initiated by either the communication endpoints 110, the servers 130, or both. During the data exchanges, the communication endpoints 110 may transmit data corresponding to changes to the images, contacts lists, and/or image privacy settings to the servers 130, as discussed above.

The servers 130 may also transmit data to the communication endpoints 110 during the data exchanges. By way of non-limiting example, the servers 130 may update the storage 112 of the communication endpoints when images associated with contacts in their contacts lists are changed. Also by way of non-limiting example, when image privacy settings corresponding to images are changed (e.g., changed from share with everyone" to "share only with my contacts"), the servers 130 may transmit instructions instructing communication endpoints 110 to delete the corresponding images from their storage 112 if those communication endpoints 110 no longer properly have access to the images under the new image privacy settings.

As a specific, non-limiting example, the user of the communication endpoint 110-1A may change the image associated with the communication endpoint 110-1A. The communication endpoint 110-1A may engage in a data exchange with the servers 130, and the communication endpoint 110-1A may transmit data corresponding to the new image to the servers 130. The servers 130 may replace, in the image database 134, the data corresponding to the old image with the data received from the communication endpoint 110-1A that corresponds to the new image. Other communication endpoints 110 may have the data corresponding to the old image stored in their storage 112 (i.e., the communication endpoint 110-1A is in their contacts lists, and the image privacy setting of the image permits). The servers 130 may engage in data exchanges with these communication endpoints 110 and transmit the data corresponding to the new image to these communication endpoints 110. These communication endpoints 110 may replace, in their storage 112, the data corresponding to the old image with the data corresponding to the new image. Thereafter, these communication endpoints 110 may present the new image associated with the communication endpoint 110-1A when presenting their contacts list to their users.

As another specific, non-limiting example, the communication endpoint 110-3 may be listed in the contacts list of the communication endpoint 110-1A, and the communication endpoint 110-1A may be listed in the contacts list of the communication endpoint 110-3 (i.e., communication endpoint 110-3 and communication endpoint 110-1A are in each others' contacts lists). The image associated with the communication endpoint 110-3 may be stored in the image database 134, together with a corresponding "share only with my contacts" image privacy setting. Accordingly, the image associated with communication endpoint 110-3 may also be stored in the storage 112-1A of the communication endpoint 110-1A for display in the contacts list of the communication endpoint 110-3. The user of the communication endpoint 110-3 may then remove the communication endpoint 110-1A from its contacts list. The change in the contacts list may be made in the storage 112-3. The communication endpoint 110-3 may engage in a data exchange with the servers 130, and the communication endpoint 110-3 may transmit data indicating the change in the contacts list to the servers 130. The servers 130 may update the contacts database 136 to reflect the change in the contacts list of the communication endpoint 110-3. The servers 130 may also determine that the image associated with the communication endpoint 110-3 should be removed from the storage 112-1A of the communication endpoint 110-1A (i.e., because the image privacy setting of the image is "share only with my contacts," and the communication endpoint 110-1A is no longer a contact of communication endpoint 110-3). The servers 130 may engage in a data exchange with the communication endpoint 110-1A, and transmit instructions to the communication endpoint 110-1A to remove the image associated with communication endpoint 110-3 from the storage 112-1A. Thereafter, when the communication endpoint 110-1A presents its contacts list to the user, the communication endpoint 110-3 may be presented in the contacts list without its associated image.

As a further specific, non-limiting example, the communication endpoint 110-3 may be listed in the contacts list of the communication endpoint 110-1A, but the communication endpoint 110-1A may not be listed in the contacts list of the communication endpoint 110-3. The image associated with the communication endpoint 110-3 may have the "share only with my contacts" image privacy setting associated therewith. Accordingly, the communication endpoint 110-1A may not store the image associated with communication endpoint 110-3 in the storage 112-1A (i.e., because the image privacy setting is the "share only with my contacts" setting, and communication endpoint 110-1A is not a contact in the contact list of the communication endpoint 110-3). If the user of the communication endpoint 110-3 changes the image privacy setting of its image to "share with everyone," the change may be saved to the storage 112-3. The communication endpoint 110-3 may engage in a data exchange with the servers 130, and transmit data indicating the change in image privacy setting for its image to the servers 130. The servers 130 may update the image database 134 to reflect the changed image privacy setting. The servers 130 may also determine that communication endpoint 110-1A should be sent the image corresponding to communication endpoint 110-3 (because the image privacy setting changed to "share with everyone"). The servers 110-3 may engage in a data exchange with the communication endpoint 110-1A, and transmit the image to the communication endpoint 110-1A. The communication endpoint 110-1A may receive the image and store the image in the storage 112-1A. Thereafter, the communication endpoint 110-1A may present the communication endpoint 110-3 and its associated image with its contacts list.

As illustrated in these specific examples, the data exchanges may enable the servers 130 to maintain and reconcile the image database 134, the contacts database 136, and each storage 112 in an up-to date state, and to comply with changing image privacy settings.

In some embodiments, the data exchanges may occur periodically. For example, either the communication endpoints 110, the servers 130, or both the communication endpoints 110 and the servers 130 may be configured to initiate a data exchange according to a predetermined schedule. By way of non-limiting example, the communication endpoints 110 may each be configured to initiate a data exchange with the servers 130 every five minutes of operation. In some embodiments, data exchanges between one of the communication endpoints 110 and the servers 130 may not occur while the one of the communication endpoints 110 is not in operation. In some embodiments, however, the data exchanges between one of the communication endpoints 110 and the servers 130 may occur even while the one of the communication endpoints 110 is not in use by the user.

In some embodiments, the data exchanges may occur responsive to a change in data stored by the communication endpoints 110 and/or the servers 130. By way of non-limiting example, the communication endpoints 110 may be configured to initiate a data exchange with the servers 130 responsive to the user thereof modifying their associated image, image privacy settings, contacts list, or combinations thereof. Also, the servers 130 may be configured to initiate a data exchange with any of the communication endpoints 110 that may be effected by new changes saved to the image database 134 and/or the contacts database 136 responsive to those changes. By way of non-limiting example, if the image privacy setting corresponding to one of the images in the image database 134 is changed, the servers 130 may initiate a data exchange with any of the communication endpoints 110 that would be required to remove, or allowed to add, data corresponding to the image to its storage 112, according to the changed privacy setting.

In some embodiments, some data exchanges may be initiated according to a predetermined schedule, and additional data exchanges may be initiated responsive to changes in data stored by the communication endpoints 110 and/or the servers 130. Also, the data exchanges may be initiated in a variety of other ways. For example, the servers 130 may attempt to initiate data exchanges with each of the communication endpoints 110 one at a time on a substantially constant basis (according to a variety of different ordering schemes).

The servers 130 are disclosed herein as determining whether image privacy settings permit for the associated images to be sent to the communication endpoints 110 for display in contacts lists of the communication endpoints 110. The disclosure, however, also contemplates that the images and the associated image privacy settings may be transmitted to communication endpoints 110, and the communication endpoints 110 may then determine whether the image privacy settings permit the communication endpoints 110 to display the images in their contacts lists.

It should be understood that the servers 130 may be configured to communicate with the communication endpoints 110 through one or more networks (not shown). For example, the servers 130 may be configured to communicate with the communication endpoints 110 through the Internet. The one or more networks may include wireless communications, wired communications, and combinations thereof. For example, the one or more networks may include mobile wireless networks, publicly switched telephone networks (PSTNs), fiber optic communications networks, WiFi™ networks, Ethernet networks, any other networks, and combinations thereof. In some embodiments, the one or more networks may include a cloud network.

Likewise, the communication endpoints 110 may be configured participate in call sessions with each other (e.g., video call sessions, text call sessions, etc.). It is also contemplated that the communication endpoints 110 may be configured to participate in relay communication sessions with hearing-capable parties. For example, a relay service may provide translation services to convert non-audible communications to audible communications that may be delivered to an audio endpoint (e.g., a standard or cellular telephone), and/or audible communications to non-audible communications that may be delivered to the communication endpoints 110.

Figure 2:
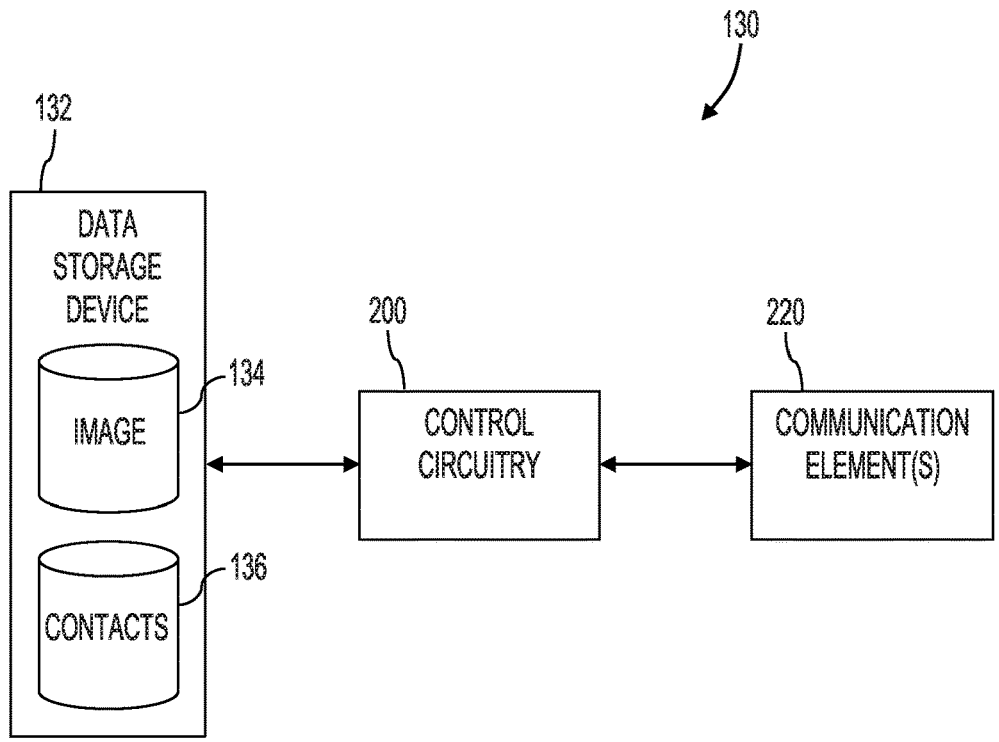
FIG. 2 is a simplified block diagram of one or more servers of the communication system of FIG. 1.

FIG. 2 is a simplified block diagram of the servers 130 of the communication system 100 of FIG. 1. The servers 130 may include control circuitry 200 operably coupled to one or more communication elements 220 (hereinafter referred to simply as the "communication elements" 220), and the storage 132. The storage 132 may include the image database 134 and the contacts database 136, as previously discussed with reference to FIG. 1. The communication elements 220 may be configured to enable the control circuitry 200 to engage in bi-directional communications with the communication endpoints 110 (FIG. 1). For example, the communication elements 220 may be configured to enable the servers 130 to engage in data exchanges with the communication endpoints 110. In other words, the control circuitry 200 may be configured to receive, through the communication elements 220, data transmitted by the communication endpoints 110, and transmit, through the communication elements 220, data to the communication endpoints 110. The control circuitry 200 may also be configured to store data received through the communication elements 220 in the storage 132.

The control circuitry 200 may be configured to access data stored in the image database 134, the contacts database 136, and incoming and outgoing data communicated through the communication elements 220. The control circuitry 200 may also be configured to determine, based at least in part on the image privacy settings of the images, which communication endpoints 110 should display which images with their contacts lists. In other words, the control circuitry 200 may, for each communication endpoint 110 listed as a contact in each of the contacts lists, check the image privacy setting for the image associated therewith. The control circuitry 200 may, based at least in part on this image privacy setting, determine whether the image should be sent to the communication endpoint 110 associated with the contacts list for presentation in its contacts list. In some embodiments, for each communication endpoint 110 listed as a contact in each of the contacts lists, data corresponding to the determination of whether the corresponding image should be presented by the communication endpoint 110 associated with the contacts list may be stored in the contacts database 134.

During data exchanges between the servers 130 and the communication endpoints 110, the control circuitry 200 may receive information regarding any updates that should be made to the image database 134 (e.g., a new image associated with a communication endpoint 110, changed image privacy settings, etc.) and the contacts database 136 (e.g., contacts added or removed from the contacts list) through the communication elements 220. The control circuitry 200 may make the updates to the image database 134 and the contacts database 136. The control circuitry 200 may also determine whether any images should be sent to the communication endpoints 110, or whether images should be removed from the storage 112 of the communication endpoints 110 (e.g., responsive to recent changes to images, image privacy settings, contacts list, etc.).

Figure 3A:
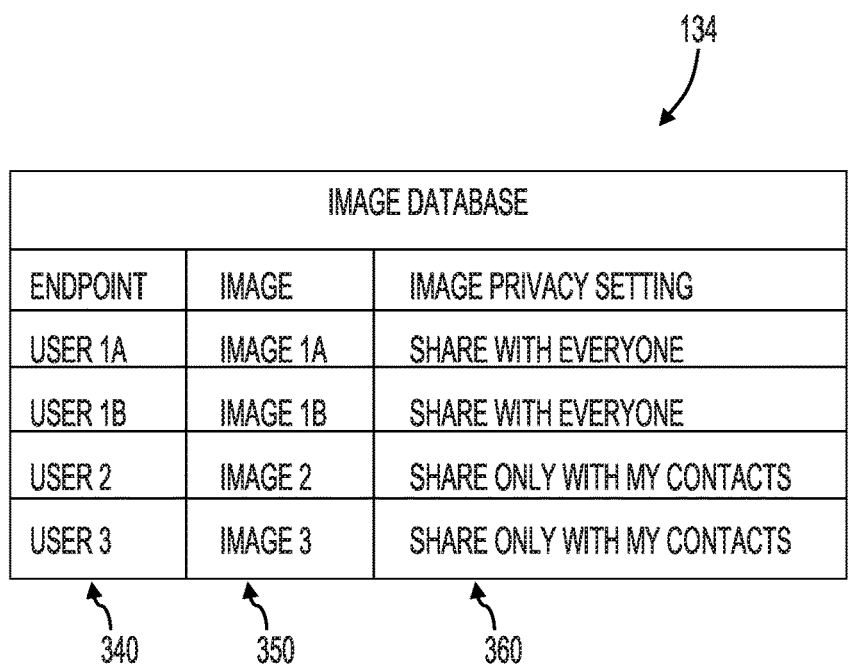
FIGS. 3A and 3B are simplified block diagrams of an example image database and contacts database, respectively, of the one or more servers of FIGS. 1 and 2.

FIG. 3A is a simplified block diagram of a non-limiting example of a possible configuration for the image database 134 of the servers 130 of FIGS. 1 and 2. As previously discussed, the image database 134 may be configured to store an image and a corresponding image privacy setting for each of the communication endpoints 110. The image database 134 may include an endpoint list 340 listing identifiers for each of the communication endpoints 110. For example, the endpoint list 340 includes "USER 1A," "USER 1B," "USER 2," and "USER 3," corresponding to communication endpoint 110-1A, communication endpoint 110-1B, communication endpoint 110-2, and communication endpoint 110-3, respectively.

The image database 134 may also include data corresponding to images 350, each one of the images 350 corresponding to one of the communication endpoints 110 from the endpoint list 340. For example, the image database 134 of FIG. 3A includes data corresponding to IMAGE 1A, IMAGE 1B, IMAGE 2, and IMAGE 3, which in turn correspond to communication endpoint 110-1A, communication endpoint 110-1B, communication endpoint 110-2, and communication endpoint 110-3, respectively.

The image database may also include a list of image privacy settings 360. The list of image privacy settings 360 includes data indicating the image privacy settings for the images 350. For example, the list of image privacy settings 360 of FIG. 3A indicates that the image privacy settings for IMAGE 1A and IMAGE 1B are both "SHARE WITH EVERYONE," and that the image privacy settings for IMAGE 3 and IMAGE 3 are both "SHARE ONLY WITH MY CONTACTS."

Figure 3B:
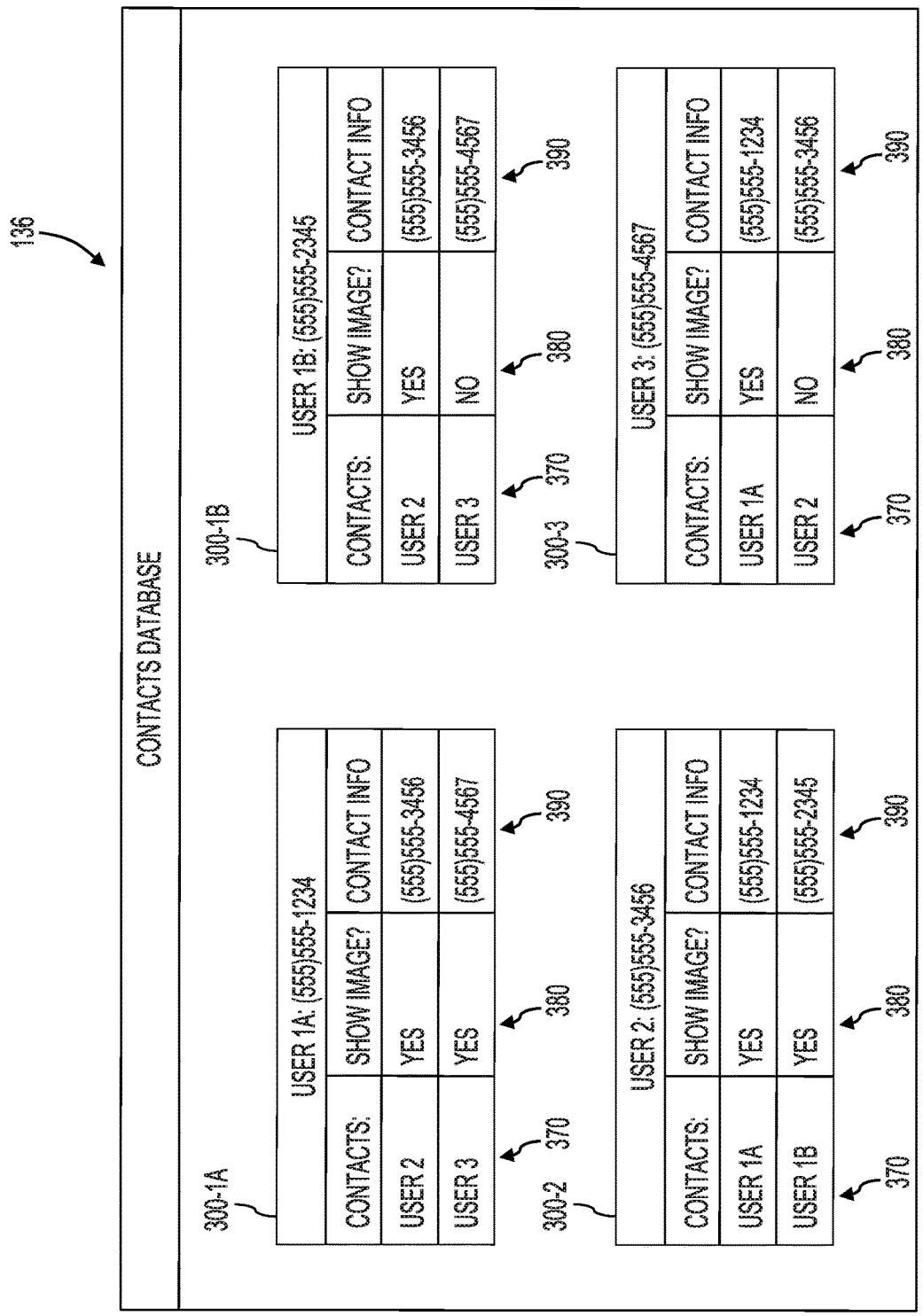

FIG. 3B is a simplified block diagram of a non-limiting example of a possible configuration for the contacts database 136 of the servers 130 of FIGS. 1 and 2. As previously discussed, the contacts database 136 may be configured to store data corresponding to the contacts list of each communication endpoint 110. For example, the contacts database 136 may include data corresponding to contacts list 300-1A, 300-1B, 300-2, and 300-3 (sometimes referred to herein generically together as "contacts lists" 300, and individually as "contacts list" 300), which in turn correspond to communication endpoint 110-1A, communication endpoint 110-1B, communication endpoint 110-2, and communication endpoint 110-3, respectively.

As illustrated in the contacts lists 300 of FIG. 3B, each contacts list 300 may include a list of contacts 370, a list of indicators 380 indicating whether images should be presented in the contacts list for those contacts (subject to the associated image privacy settings), and contact information 390 (e.g., a telephone number, an Internet protocol (IP) address, a media access control (MAC) address, a serial number, other contact information, and combinations thereof).

As illustrated in the contacts list 300-1A of FIG. 3B, USER 2 and USER 3 are listed in USER 1A's contacts list (i.e., communication endpoint 110-2 and communication endpoint 110-3 are listed in the contacts list 300-1A of communication endpoint 110-1A). The identifiers 380 of contacts list 300-1A indicate that the images corresponding to USER 2 and USER 3 should both be presented to the user of communication endpoint 110-1A (because the image privacy settings of the images associated with USER 2 and USER 3 are both "share only with my contacts" (FIG. 3A), and as illustrated in the contacts lists 300-2 and 300-3, USER 1A is a contact listed in both USER 2's and USER 3's contacts lists 300-2, 300-3).

As illustrated in the contacts list 300-1B of FIG. 3B, USER 2 and USER 3 are listed in USER 1B's contacts list (i.e., communication endpoint 110-2 and communication endpoint 110-3 are listed in the contacts list 300-1B of communication endpoint 110-1B). The identifiers 380 of contacts list 300-1B indicate that the image corresponding to USER 2 should be presented in the contacts list 300-1B to the user of communication endpoint 110-1B (because the image privacy setting of the image associated with USER 2 is "share only with my contacts" (FIG. 3A), and as illustrated in the contacts list 300-2, USER 1B is a contact listed in USER 2's contacts list 300-2). The identifiers 380 of contacts list 300-1B, however, also indicate that the image corresponding to USER 3 should not be presented in the contacts list 300-1B to the user of communication endpoint 110-1B (because the image privacy setting of the image associated with USER 3 is "share only with my contacts" (FIG. 3A), and as illustrated in the contacts list 300-3, USER 1B is not listed in USER 3's contacts list 300-3).

As illustrated in the contacts list 300-2 of FIG. 3B, USER 1A and USER 1B are listed in USER 2's contacts list (i.e., communication endpoint 110-1A and communication endpoint 110-1B are listed in the contacts list 300-2 of communication endpoint 110-2). The identifiers 380 of contacts list 300-2 indicate that the images corresponding to USER 1A and USER 1B should both be presented with the contacts list 300-2 to the user of communication endpoint 110-2 (because the image privacy settings of the images associated with USER 1A and USER 1B are both "share with everyone" (FIG. 3A)).

As illustrated in the contacts list 300-3 of FIG. 3B, USER 1A and USER 2 are listed in USER 3's contacts list (i.e., communication endpoint 110-1A and communication endpoint 110-2 are listed in the contacts list 300-3 of communication endpoint 110-3). The identifiers 380 of contacts list 300-3 indicate that the image corresponding to USER 1A should be presented in the contacts list 300-3 to the user of communication endpoint 110-3 (because the image privacy setting of the image associated with USER 1A is "share with everyone" (FIG. 3A), and as illustrated in the contacts list 300-1A, USER 3 is a contact listed in USER 1A's contacts list 300-1A). The identifiers 380 of contacts list 300-3, however, indicate that the image corresponding to USER 2 should not be presented in the contacts list 300-3 to the user of communication endpoint 110-3 (because the image privacy setting of the image associated with USER 2 is "share only with my contacts" (FIG. 3A), and as illustrated in the contacts list 300-2, USER 3 is not listed in USER 2's contacts list 300-2).

Figure 4:
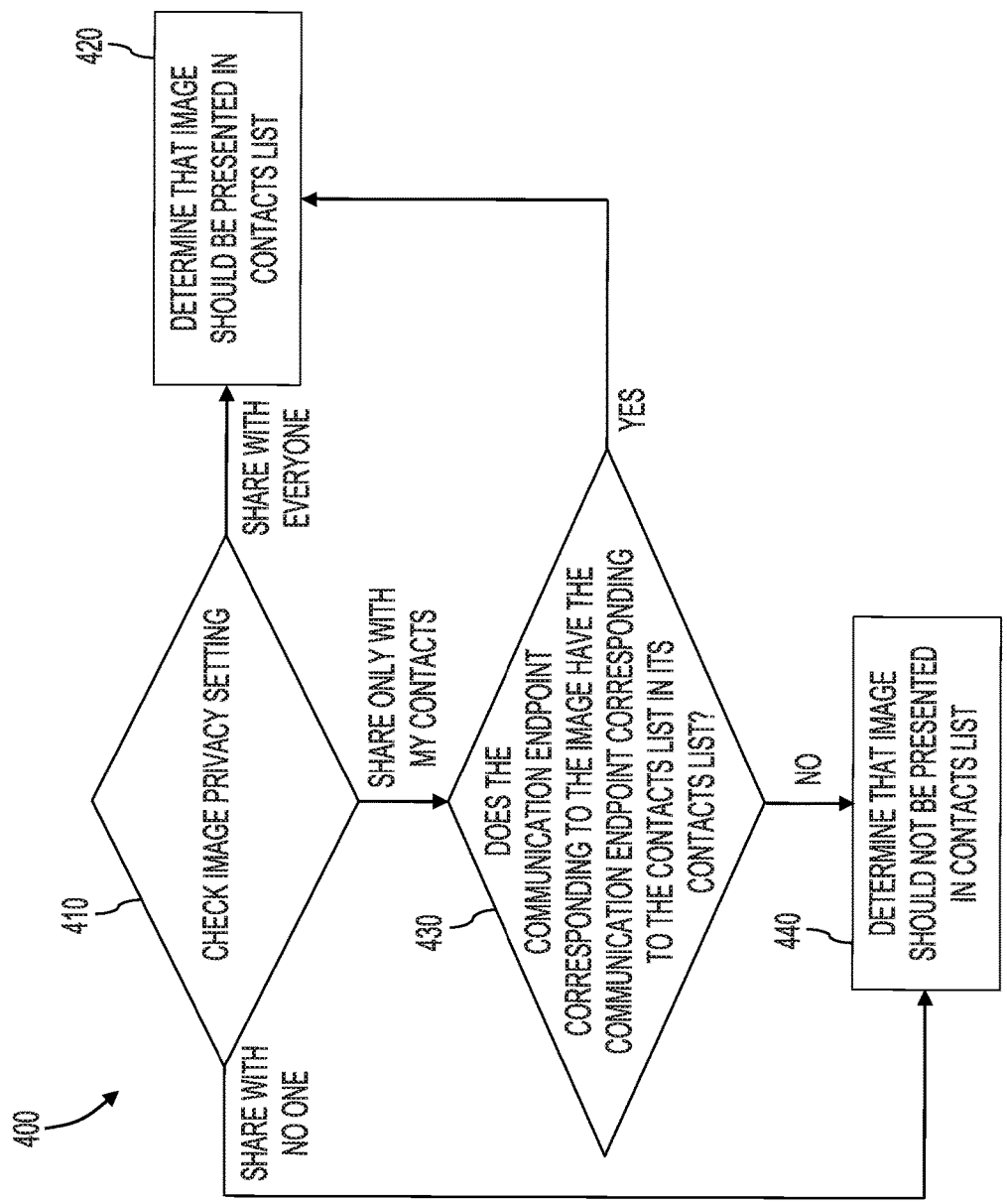
FIG. 4 is a simplified flowchart illustrating a method of determining whether an image should be presented with a contacts list to a user of a communication endpoint of the communication system of FIG. 1.

FIG. 4 is a simplified flowchart 400 illustrating a method of determining whether an image should be presented with a contacts list to a user of a communication endpoint 110. As previously discussed, the servers 130 may be configured to determine, based at least in part on the image privacy settings of the images, which communication endpoints 110 should display which images with their contacts lists (FIG. 1). Accordingly, in some embodiments, the servers 130 (e.g., the control circuitry 200 of the servers 130) may be configured to perform the acts of the method illustrated in the flowchart 400 for each image that is associated with a contact entry in each of the contacts lists 300 stored in the contacts database 136. In some embodiments, however, the communication endpoints 110 may instead be configured to perform the acts of the method illustrated in the flowchart 400 for each image that is associated with a contact entry in their own contacts lists.

At operation 410, the method may include checking the image privacy setting for an image corresponding to a contact entry in a contacts list. In some embodiments, checking the image privacy setting may include accessing the image database 134 with the control circuitry 200 of the servers 130 to obtain the image privacy setting. In some embodiments, checking the image privacy setting may include transmitting, from a communication endpoint 110 to the servers 130, a request for the image privacy setting, and receiving, from the servers 130 with the communication endpoint 110, the image privacy setting.

If the image privacy setting for the image is "share with everyone," at operation 420 the method may include determining that the image should be presented to the user of the communication endpoint 110 with the contacts list.

Returning to operation 410, if the image privacy setting for the image is "share only with my contacts," at operation 430 the method includes determining whether the communication endpoint 110 corresponding to the contacts list is listed in the contacts list of the communication endpoint 110 corresponding to the image. If it is determined that the communication endpoint 110 corresponding to the contacts list is listed in the contacts list of the communication endpoint 110 corresponding to the image, at operation 420, the method may include determining that the image should be presented to the user of the communication endpoint 110 with the contacts list.

Returning to operation 430, if it is determined that the communication endpoint 110 corresponding to the contacts list is not listed in the contacts list of the communication endpoint 110 corresponding to the image, at operation 440, the method may include determining that the image should not be presented to the user of the communication endpoint 110 in the contacts list.

Returning to operation 410, if the image privacy setting for the image is "share with no one," at operation 440 the method may include determining that the image should not be presented to the user of the communication endpoint 110 in the contacts list.

Figure 5:
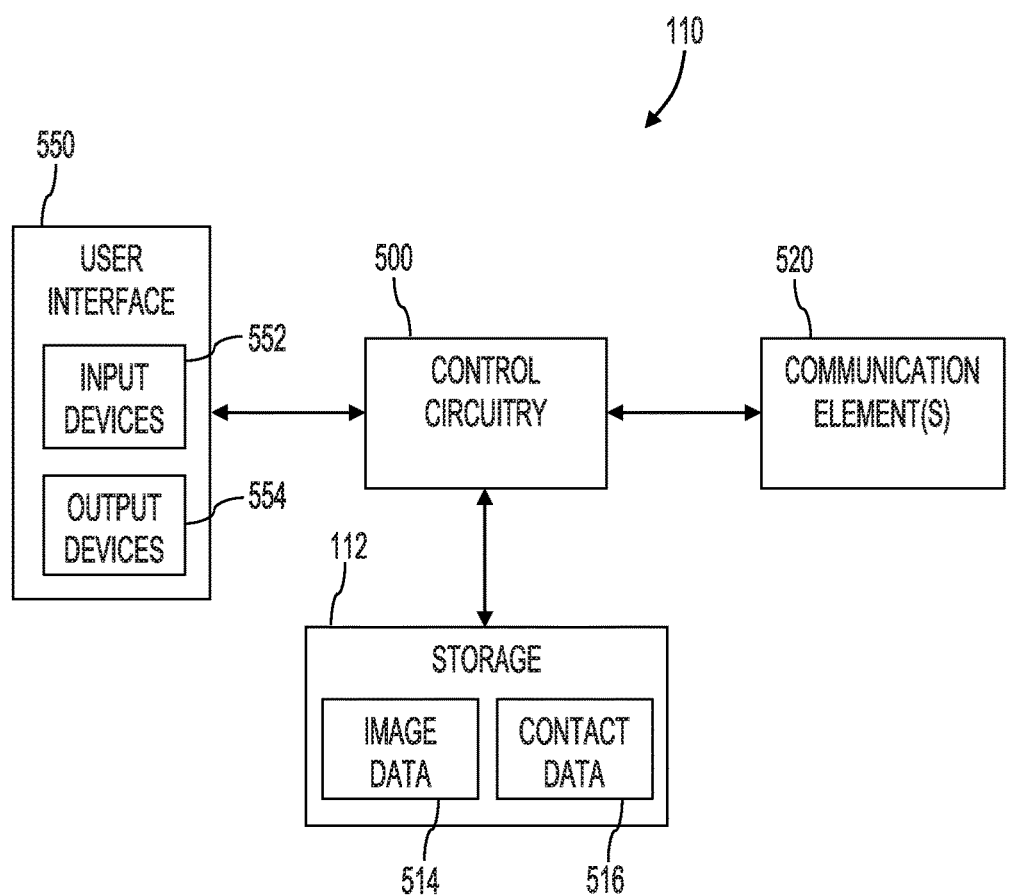
FIG. 5 is a simplified block diagram of a communication endpoint of the communication system of FIG. 1.

FIG. 5 is a simplified block diagram of a communication endpoint 110 of the communication system 100 of FIG. 1. The communication endpoint 110 may include control circuitry 500 operably coupled to one or more communication elements 520 (sometimes referred to herein as "communication elements" 500), the storage 112, and a user interface 550. The communication endpoint 110 may be configured to enable an audibly impaired user to participate in at least partially non-audible communications with other audibly impaired users of other communication endpoints 110 (e.g., video communications, textual communications, etc.).

As previously discussed, the communication endpoint 110 may have a user account associated therewith, along with an image and a contacts list. In some embodiments, image data 514 and contact data 516 may be stored in the storage 112. The image data 514 may include data corresponding to the image, and the associated image privacy setting. The contact data 516 may include data corresponding to the contacts list 300. By way of non-limiting example, the contact data 516 may include the contacts list. The contacts list may include contact information (e.g., a telephone number, an Internet protocol (IP) address, a media access control (MAC) address, a serial number, other contact information, and combinations thereof) for each contact in the contacts list. The contact data 516 may also include data corresponding to images of some of the contacts listed in the contacts list (i.e., if the associated image privacy settings permit).

The control circuitry 500 may be configured to present information from the contacts list of the contact data 516 to the user with one or more output devices 554 (hereinafter "output devices" 554) of the user interface 550. For example, the output devices 554 may include an electronic display (e.g., a liquid crystal display (LCD), a light emitting diode (LED) display, an LED array, an image projection device, a cathode ray tube (CRT), a touchscreen, other electronic displays, and combinations thereof), and the control circuitry 500 may be configured to display the contacts list on the electronic display. The contacts list displayed on the electronic display may include images of some of the contacts displayed in the contacts list (subject to the image privacy settings of the images associated with the contacts). In some embodiments, the contacts list may be displayed in a graphical user interface (GUI), such as, for example the GUI 600 illustrated in FIG. 6B. In some embodiments, the user interface 550 may be configured to enable the user to select between enabling and disabling the functionality of displaying images of the contacts in the contacts list.

The control circuitry 500 may also be configured to modify the contacts data 516 responsive to user interactions with the user interface 550. The user may interact with the user interface using one or more input devices 552 (hereinafter "input devices" 552) and the output devices 554. For example, the control circuitry 500 may present information and options to the user via the output devices 554. The output devices may include electronic displays, audio speakers, other devices capable of delivering information and options to the user, and combinations thereof. The input devices 552 may include a keyboard, a keypad, a mouse, audio sensors (e.g., microphones), remote controls, image capturing devices (e.g., cameras), haptic sensors, touchscreen inputs, other devices capable of enabling the user to navigate information and select options presented by the output devices 554, and combinations thereof.

The user interface 550 may be configured to enable the user to add, remove, and modify contacts in the contacts list. In some embodiments, the user interface 550 may include a GUI configured to present user options to enable the user to add, remove, and modify the contacts, such as, for example the GUI 600 illustrated in FIG. 6B. The control circuitry 500 may further be configured to modify the contact data 516 responsive to communications received from the servers 130 (FIG. 1) during data exchanges. For example, the servers 130 may direct the control circuitry 500 to add or delete data corresponding to an image of a contact in the contacts list to or from the contact data 516, responsive to changes in contacts lists, images, image privacy settings, and combinations thereof in the image database 134 and the contacts database 136 of the servers 130.

The control circuitry 500 may also be configured to modify the image data 514 responsive to user interactions with the user interface 550. For example, the user interface 550 may be configured to enable the user to add, delete, and/or change the image associated with the endpoint 110, and change the corresponding image privacy setting. By way of non-limiting example, the user interface 550 may include the GUI 600 illustrated in FIG. 6C.

In some embodiments, the input devices 552 may include an image capturing device (e.g., a camera). In such embodiments, the user interface 550 may be configured to enable the user to capture an image to be associated with the communication endpoint 110 using the image capturing device, and store the captured image in the image data 514. In some embodiments, the user interface 550 may be configured to enable the user to browse through images stored in the control circuitry 500, the storage 112, or combinations thereof, and select an image to be associated with the communication endpoint 110. The selected image may be stored in the image data 514. In some embodiments, the control circuitry 500 may be configured to enable the user to select an image stored on external devices to be associated with the communication endpoint 110, and store the selected image in the image data 514. For example, the communication elements 520 may include a universal serial bus (USB) interface, a BLUETOOTH® interface, a WIFI™ interface, an Ethernet interface, an SD card interface, or other interface capable of communicating with external devices.

The communication elements 520 may further be configured to enable the communication endpoint 110 to communicate with the servers 130, and other communication endpoints 110 (FIG. 1). For example, the communication elements 520 may be configured to enable the control circuitry 500 to receive communications from the servers 130 and the other communication endpoints 110. The communication elements 520 may also be configured to enable the control circuitry 500 to transmit communications to the servers 130 and the other communication endpoints 110.

The functions discussed above with reference to the communication endpoint 110 may be carried out, in large part, by the control circuitry 500, at the direction of the control circuitry, and a combination thereof. More detail regarding the control circuitry 500 is discussed below with reference to FIG. 7.

Figure 6A:
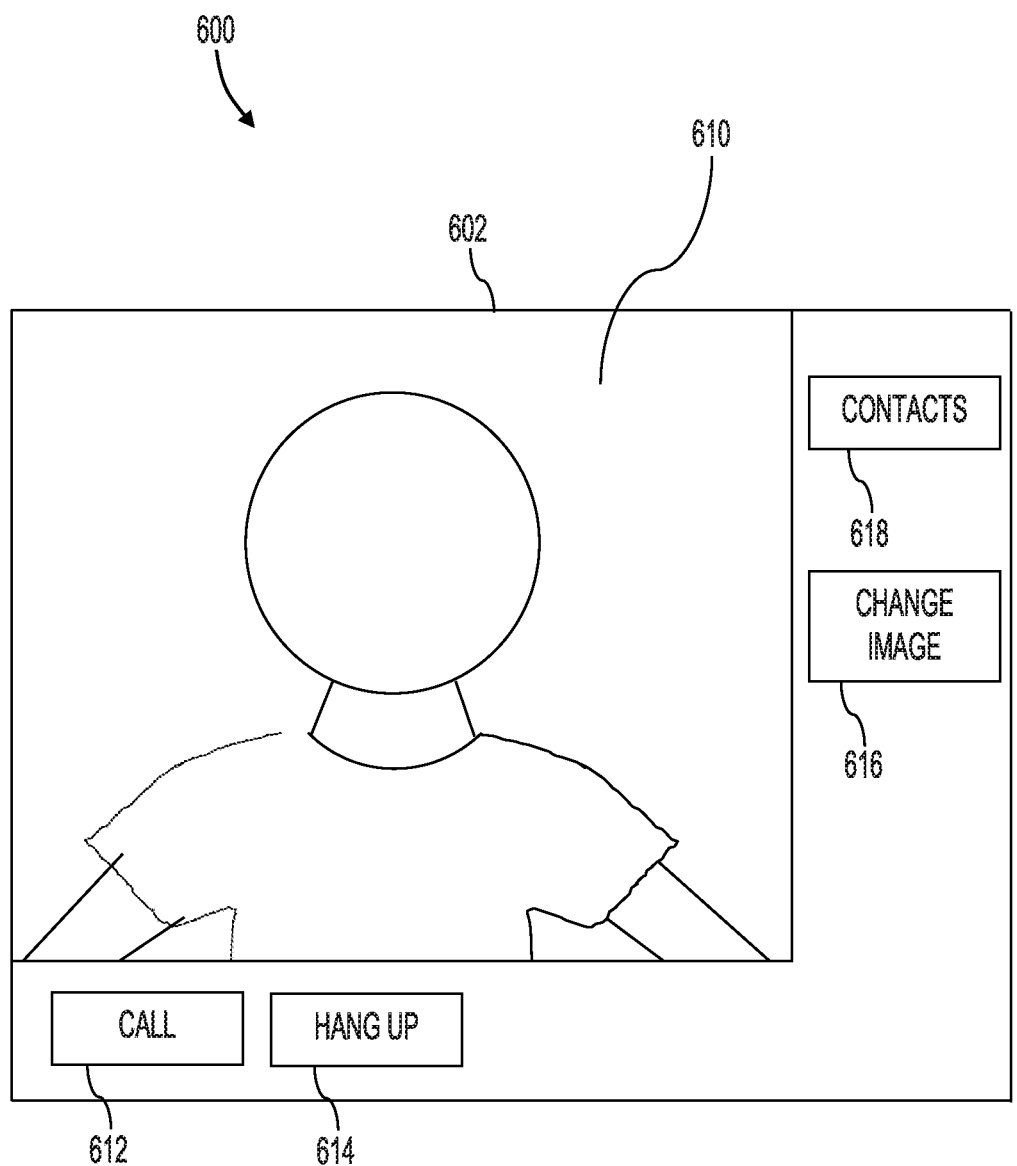
FIGS. 6A through 6C illustrate an example of a graphical user interface that a user interface of the communication endpoint of FIG. 5 may include.
Figure 6B:
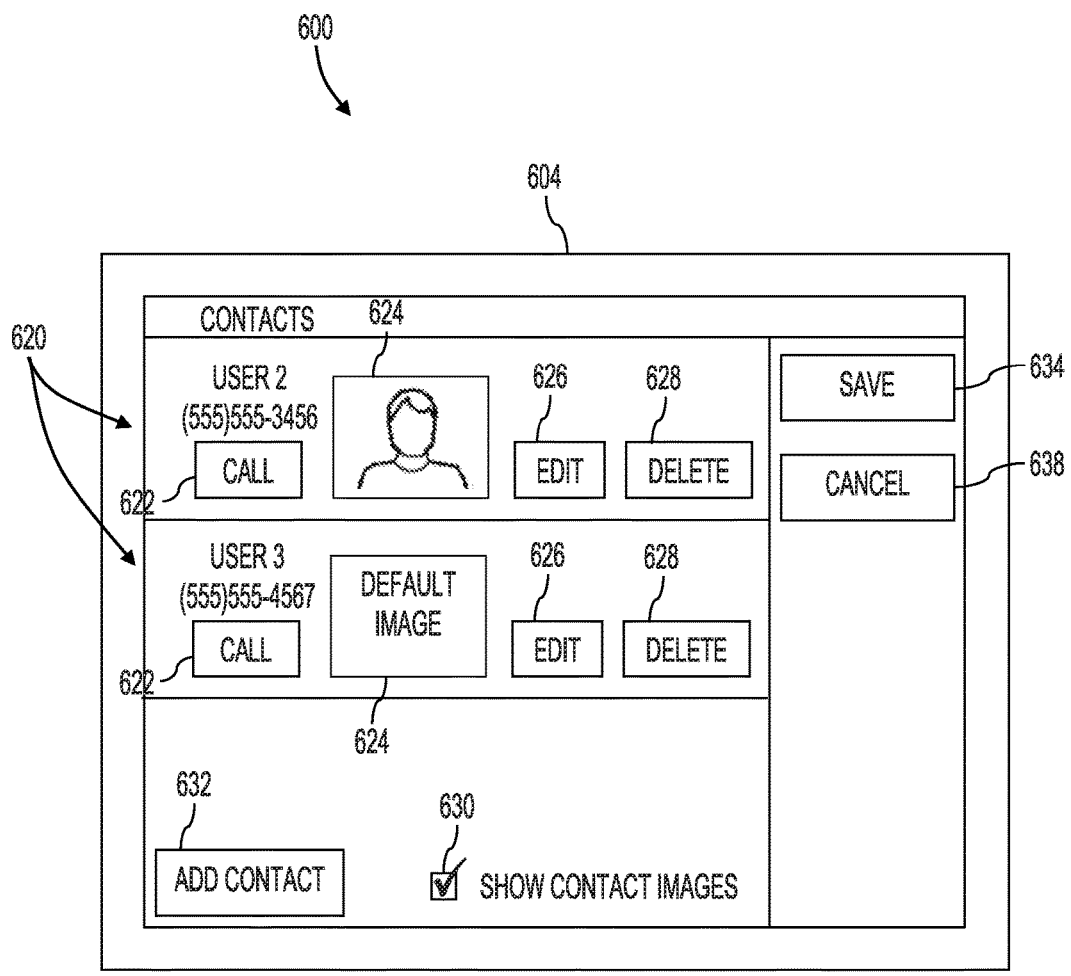
Figure 6C:
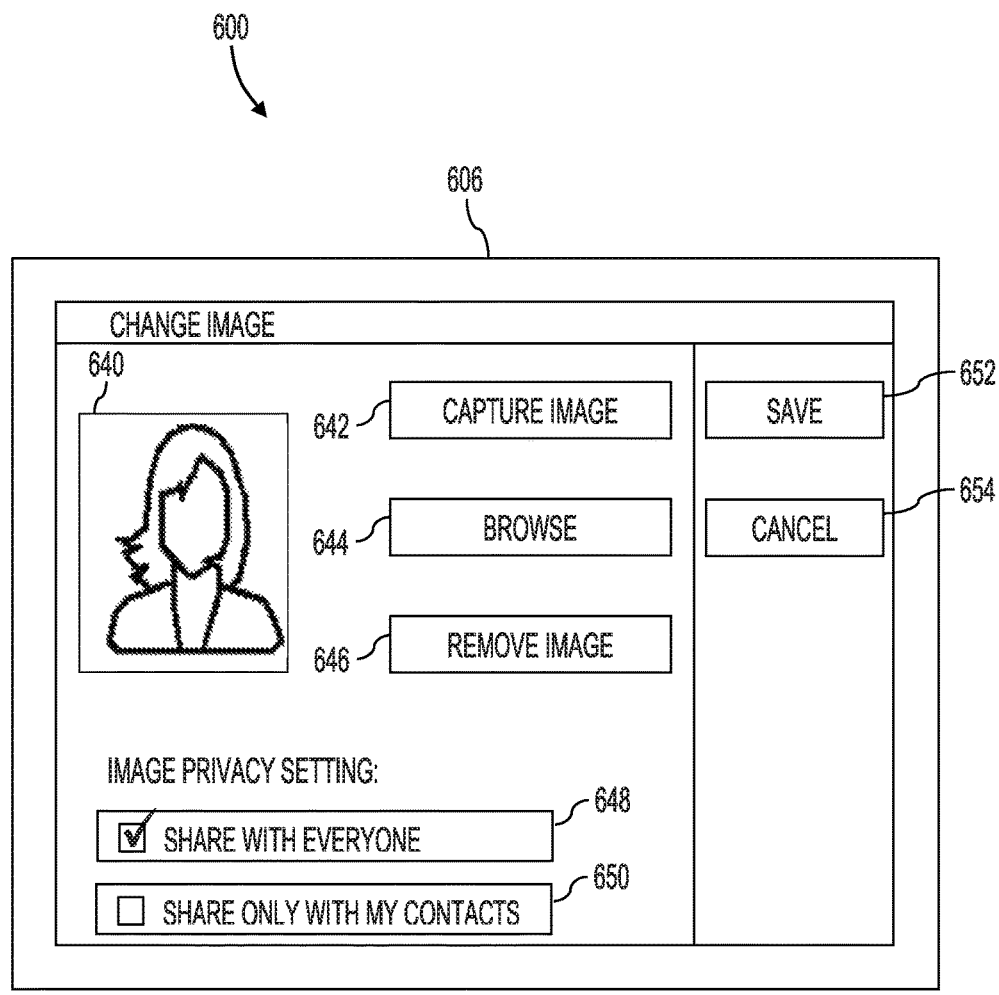

FIGS. 6A through 6C illustrate an example of a graphical user interface (GUI) 600 that the user interface 550 of the communication endpoint 110 (FIG. 5) may include. Referring to FIG. 6A, the GUI 600 may include a call interface 602 configured to enable the user to place and receive calls (e.g., initiate video or textual communication sessions) to and from other communication endpoints 110. The call interface 602 may also be configured to enable the user to navigate to a contacts interface 604 (FIG. 6B) and an image interface 606 (FIG. 6C).

The call interface 602 may include a non-audible communications field 610. The non-audible communications field may be configured to present non-audible communications to the user. By way of non-limiting example, the non-audible communications field 610 may include a video field that displays video images received from another communication endpoint 110 (FIG. 1) during a video call with the other communication endpoint 110. Also by way of non-limiting example, the non-audible communications field 610 may include a text field that displays text received from another communication endpoint 110 during a textual communication session with the other communication endpoint 110.

The call interface 602 may also include a call option 612 and a hang up option 614, which may be configured to enable the user to initiate and end communications with other communication endpoints 110. For example, the communication endpoint 110 may be configured to transmit communication requests to other communication endpoints 110, and accept communication requests from the other communication endpoints 110, responsive to a user selection of the call option 612. Also, the communication endpoint 110 may be configured to terminate in-progress communication sessions with other communication endpoints 110 responsive to a user selection of the hang up option 614.

The call interface may further include a contacts option 618 and a change image option 616. Responsive to a user selection of the contacts option 618, the contacts interface 604 (FIG. 6B) may be presented to the user. Also, responsive to a user selection of the change image option 616, the image interface 606 (FIG. 6C) may be presented to the user.

FIG. 6B is the example GUI 600 presenting the contacts interface 604. Contacts 620 from a contacts list associated with the communication endpoint 110 may be listed in the contacts interface 604. For example, the contacts listed in the contacts interface 604 of FIG. 6B are the contacts from the contacts list 300-1B (FIG. 3B) of communication endpoint 110-1B. Accordingly, the communication endpoint 110-1B may present a contacts interface similar to the contacts interface 604 illustrated in FIG. 6B. Of course, the other communication endpoints 110-1A, 110-2, and 110-3 may present contacts interfaces including the contacts from their corresponding contacts lists 300-1A, 300-2, and 300-3.

Some of the contacts 620 may include an image 624. The image 624 may include the image associated with the contact 620 (i.e., if the image privacy setting for the image corresponding to the contact permits its display). In some embodiments, the image 624 may include a smaller version (e.g., a lower-resolution version) of the image associated with the contact 620. In some embodiments, the image 624 may include a default image if there is no image associated with the contact 620, or if the image privacy setting of the image associated with the contact 620 does not permit the image to be displayed. As illustrated in FIG. 6B, the image 624 of USER 3 is a default image (i.e., because the image privacy setting of the image associated with USER 3 is "share only with my contacts" (FIG. 3A), and USER 1B is not one of USER 3's contacts (FIG. 3B)). In some embodiments, no image 624 may be presented for the contact 620 if there is no image associated with the contact, or if the image privacy setting for the image associated with the contact 620 does not permit the image to be displayed.

The contacts interface 604 may be configured to enable the user to edit and delete the contacts 620, and call (e.g., initiate a video communication session with) the communication endpoints 110 corresponding to the contacts 620. By way of non-limiting example, the contacts interface 604 may include a call option 622, an edit option 626, and a delete option 628. In some embodiments, as illustrated in the contacts interface 604 of FIG. 6B, each contact 620 may include its own call option 622, edit option 626 and delete option 628.

Responsive to a user selection of the call option 622 corresponding to one of the contacts 620, an invitation to participate in a communication session may be sent to the communication endpoint 110 that corresponds to the contact 620.

Responsive to a user selection of the edit option 626 corresponding to one of the contacts 620, the user may be enabled to edit the contact 620. For example, the contact information associated with the contact may be changed or added (e.g., a telephone number may be changed, added, etc.), the name associated with the contact may be changed or added, other contact information may be edited, and combinations thereof. Responsive to a user selection of the delete option 628 corresponding to one of the contacts 620, the contact 620 may be removed from the contacts list.

The contacts interface 604 may be further configured to enable the user to add contacts 620 to the contacts list. For example, the contacts interface 604 may include an add contact option 632. Responsive to a user selection of the add contact option 632, the user may be presented options for adding contacts to the contacts lists. For example, the user may be prompted for a unique identifier or name for a new contact (e.g., a phone number, etc.), or allowed to browse through and select new contacts from an Online directory (e.g., stored at the servers 130) of other communication endpoints 110.

In some embodiments, the contacts interface 604 may also be configured to enable the user to direct whether or not the contacts interface 604 presents the images 624. By way of non-limiting example, the contacts interface 604 may include a show contact images option 630. If the show contact images option 630 is selected, the contacts interface 604 may display the images 624.

The contacts interface may also include a save option 634 and a cancel option 638. Responsive to a user selection of the save option 634, any changes made to the contacts 620, and any contacts that are added or deleted, may be saved to the contact data 516 of the storage 112 (FIG. 5). Responsive to a user selection of the cancel option 638, the user interface 600 may display the call interface 602 (FIG. 6A).

FIG. 6C is the example GUI 600 presenting the image interface 606. The image interface 606 may be configured to enable the user to change an image 640 (e.g., capture a new image 640, browse for an image stored by the communication endpoint 110, or delete the image 640) associated with the communication endpoint 110 (FIGS. 1 and 5). The image interface 606 may include a capture image option 642, a browse option 644, and a remove image option 646. Responsive to a user selection of the capture image option 642, an image capturing device of the communication endpoint 110 may be activated, and the user may capture an image using the image capturing device. The captured image may replace the image 640 to become a new image 640 associated with the communication endpoint 110.

Responsive to a user selection of the browse option 644, the image interface 606 may enable the user to browse through and select image files (e.g., .jpeg files, .gif files, .pdf files, .tiff files, .bmp files, etc.) stored by the communication endpoint 110 (e.g., stored in the storage 112). An image corresponding to a selected image file may replace the image 640, and become the new image 640 associated with the communication endpoint 110.

Responsive to a user selection of the remove image option 646, data corresponding to the image 640 may be deleted from the image data 614 of the storage 112 (FIG. 5), and no image may be associated with the communication endpoint 110.

The image interface 606 may also be configured to enable the user to change the image privacy setting associated with the image 640. In some embodiments, the image interface 606 may be configured to enable the user to select from a list of image privacy settings that the communication endpoint 110 is capable of applying. For example, the image interface 606 may include a share with everyone option 648 and a share only with my contacts option 650. Other image privacy settings may also be presented to the user in some embodiments (e.g., a share with no one option, an ask for my permission option, etc.).

Responsive to a user selection of the share with everyone option 648, the image privacy setting of the image 640 may be changed to "share with everyone." Similarly, responsive to a user selection of the share only with my contacts option 650, the image privacy setting of the image 640 may be changed to "share only with my contacts."

The image interface may further include a save option 652 and a cancel option 654. Responsive to a user selection of the save option 652, any changes made to the image 640, and the image privacy setting, may be saved to the image data 514 of the storage 112 (FIG. 5). Also, responsive to a user selection of the cancel option 654, the user interface 600 may display the call interface 602 (FIG. 6A).

Figure 7:
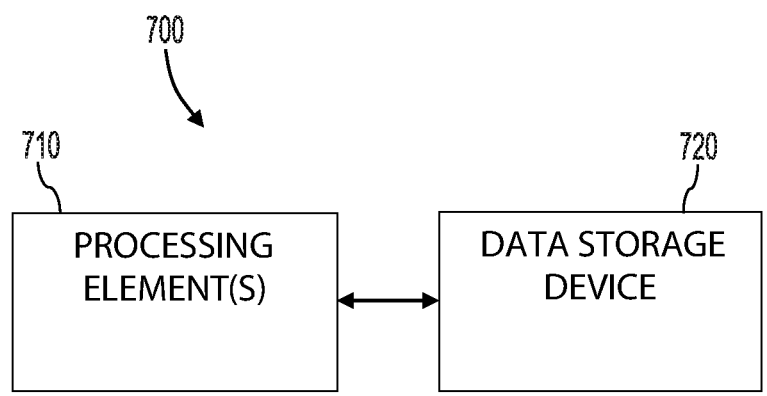
FIG. 7 is a simplified block diagram of a computing device that may be included by the one or more servers of FIGS. 1 and 2, and the communication endpoint of FIGS. 1 and 5.

FIG. 7 is a simplified block diagram of a computing device 700. In some embodiments, the control circuitry 200 (FIG. 2), the control circuitry 500 (FIG. 5), or both the control circuitry 200 and the control circuitry 500 may include a computing device 700. The computing device 700 may include one or more processing elements 710 (hereinafter "processing elements" 710) operably coupled to one or more data storage devices 720 (hereinafter "storage" 720). The storage 720 may include a hard disk drive, a solid state drive, a digital media reader (e.g., a CD ROM drive, a DVD ROM drive, a floppy disk drive, a memory card reader, etc.) random access memory (e.g., SRAM, DRAM, etc.), flash memory, an electrically programmable read only memory (EPROM), other storage devices, and combinations thereof. The storage 720 may include computer-readable instructions directed to embodiments of the disclosure. For example, the storage 720 may include computer-readable instructions directed to the functions of the control circuitry 200, or the control circuitry 500.

The processing elements 710 may be configured to execute the computer-readable instructions of the storage 720. Accordingly, the computer-readable instructions transform the computing device 700 from a computer into a special-purpose computer configured for carrying out embodiments of the disclosure. By way of non-limiting example, the processing elements 710 may include a microcontroller configured to execute computer-readable instructions (e.g., firmware, software) stored internally or externally to the microcontroller. Also by way of non-limiting example, the processing elements 700 may include a central processing unit (CPU) (e.g., of a desktop personal computer (PC), a laptop computer, a tablet computer, a smartphone, a PDA, etc.) configured to execute the computer-readable instructions in an operating system environment.

The disclosure is not limited to control circuitry 200, 500 including the computing device 700. In some embodiments, either or both of the control circuitry 200 and the control circuitry 500 may, in addition to or instead of the computing device 700, be implemented with an array of logic circuits arranged and interfaced in a manner selected to perform at least a portion of the functions the control circuitry 200, 500 is configured to perform. By way of non-limiting example, the control circuitry 200, 500 may include an array of logic circuits interfaced with programmable switches that are positioned in a manner selected to carry out the functions that the control circuitry 200, 500 is configured to perform (e.g., an FPGA). Also by way of non-limiting example, the array of logic circuits may be interfaced using hard-wired interfaces (e.g., an ASIC).

Figure 8:
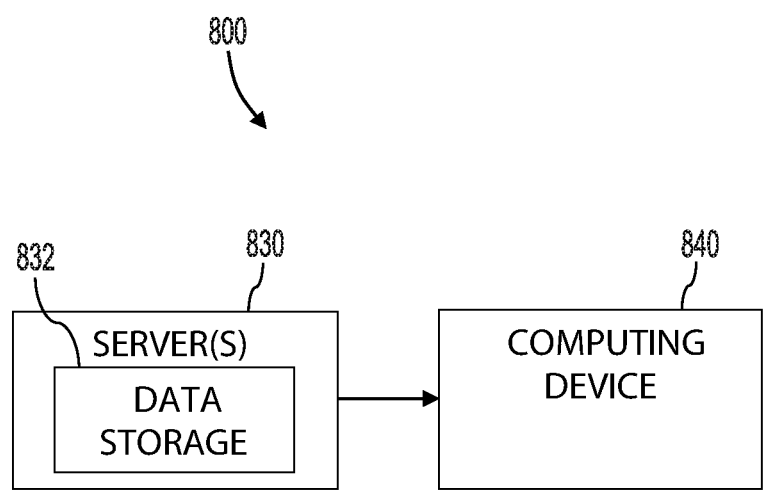
FIG. 8 is a system for converting a computing device into the communication endpoint of FIG. 5.

FIG. 8 is a system 800 for converting a computing device 840 into a communication endpoint 110. The system 800 may include one or more servers 830 (e.g., the servers 130) configured to communicate with the computing device 840. The servers 830 may include one or more data storage devices 832 (hereinafter "data storage" 832). The data storage 832 may include computer-readable instructions directed to causing the computing device 840 to perform the actions that the communication endpoint 110 (FIG. 5) is configured to perform. For example, the computer-readable instructions may be directed to directing the computing device 840 to present the user interface 600 (FIGS. 6A through 6C) to a user, engage in data exchanges with the servers 130 (FIG. 1), enable the user to participate in non-audible communications with users of other communication endpoints 110 (FIG. 1), and store the image data 514 and the contact data 516 (FIG. 5).

The servers 830 may be configured to transmit the computer-readable instructions from the data storage 832 to the computing device 840. The computing device 840 may be configured to receive the computer-readable instructions from the servers 830, and execute the computer-readable instructions.

In some embodiments, the computing device 840 may include a personal computer (PC), such as, for example, a desktop computer or a laptop computer. In such embodiments, the servers 830 may include a web server configured to distribute computer software (e.g., for execution by the computing device 840 in a thin client or thick client architecture) for transforming the PC into a communication endpoint.

In some embodiments, the computing device 840 may include a mobile wireless device, such as, for example, a smartphone, a tablet computer, a personal digital assistant (PDA), or other mobile wireless device (e.g., a smartwatch, smartglasses, etc.). In such embodiments, the servers 830 may be configured to provide a mobile wireless software application distributer (e.g., an app store).

In some embodiments, the computing device 840 may include a video phone device. In such embodiments, the servers 830 may be configured to provide computer-readable instructions that may be executed by one or more processing elements included in the video phone.

Figure 9:
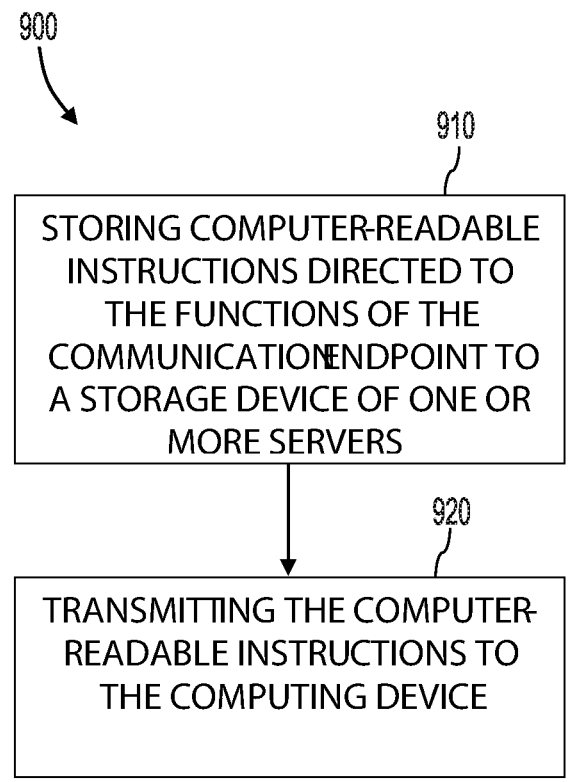
FIG. 9 is a simplified flowchart illustrating a method of transforming the computing device of FIG. 8 into the communication endpoint of FIG. 5.

FIG. 9 is a simplified flowchart 900 illustrating a method of transforming the computing device 840 of FIG. 8 into the communication endpoint 110 of FIG. 5. Referring to FIGS. 8 and 9 together, at operation 910, the method may include storing computer-readable instructions on a data storage 832 of the servers 830. The computer-readable instructions may be directed to instructing the computing device 840 to perform the actions that the communication endpoint 110 (FIG. 5) is configured to perform. For example, the computer-readable instructions may be directed to directing the computing device 840 to present the user interface 600 (FIGS. 6A through 6C) to a user, engage in data exchanges with the servers 130 (FIG. 1), enable the user to participate in non-audible communications with users of other communication endpoints 110 (FIG. 1), and store the image data 514 and the contact data 516 (FIG. 5).

At operation 920, the method may include transmitting the computer-readable instructions to the computing device 840. Transmitting the computer-readable instructions may include transmitting a mobile software application, a software application configured for execution in a computer operating system environment, web application scripts, other computer-readable instruction configurations, and combinations thereof.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication endpoint configured for use by an audibly impaired user, the communication endpoint comprising:
one or more communication elements including at least one interface configured to enable the communication endpoint to communicate with:
a plurality of other communication endpoints associated with other audibly impaired users; and
one or more servers, each of the communication endpoint and the plurality of other communication endpoints having an image and a corresponding image privacy setting associated therewith stored remotely at the one or more servers, the communication endpoint also having a contacts list corresponding thereto stored remotely at the one or more servers, the contacts list including a list of contacts corresponding to a subset of the plurality of other communication endpoints associated with the other audibly impaired users;
a data storage device configured to locally store image data and at least one privacy setting corresponding to the image of each of a selected portion of the plurality of other communication endpoints; and
a user interface;
control circuitry operably coupled with the one or more communication elements, the data storage device, and the user interface, wherein the control circuitry is configured to:
enable the communication endpoint to engage in communication sessions with the plurality of other communication endpoints; and
cause the user interface to present the contacts list to a user of the communication endpoint;
cause the user interface to display the corresponding image associated with each contact in the contacts list responsive to the one or more servers determining that the corresponding image privacy setting permits the communication endpoint to present the image;
receive instructions from the one or more servers to change at least one privacy setting corresponding to a contact in the contacts list responsive to one of the other audibly-impaired users initiating the change in the at least one privacy setting from their respective communication endpoint; and
removing the corresponding image by deleting the image data from the data storage device of the communication endpoint to no longer be stored locally on the communication endpoint in response to the instructions received.

2. The communication endpoint of claim 1, wherein the control circuitry is further configured to enable the user to interact with the user interface to modify the contacts list, the image, and the corresponding image privacy setting corresponding to the user's communication endpoint to send instructions to the one or more servers to cause a change in the images stored by the other audibly-impaired users' respective communication endpoints.

3. The communication endpoint of claim 1, further comprising an image capturing device, wherein the control circuitry is configured to enable the user to interact with the user interface to capture a captured image using the image capturing device, and transmit the captured image to the one or more servers to be the image associated with the communication endpoint for use by the other communication endpoints.

4. The communication endpoint of claim 1, wherein each contact of the contacts list includes contact information selected from the group consisting of a telephone number, an IP address, a MAC address, a serial number, and any combination thereof.

5. The communication endpoint of claim 1, wherein the at least one interface includes at least one of a universal serial bus (USB) interface, a Bluetooth interface, a WiFi interface, an Ethernet interface, an SD card interface, or any combination thereof.

6. A video communication device for an audibly impaired user, the video communication device comprising:
communication elements;
an electronic display;
an image capturing device;
a data storage device; and
control circuitry operably coupled with the communication elements, the electronic display, the image capturing device, and the data storage device, the control circuitry configured to:
manage a first contacts list for the video communication device and communicate changes to the first contacts list with a remote server, wherein the first contacts list includes contacts corresponding to other video communication devices of a network;
receive images from the remote server, the images corresponding to the contacts in the first contacts list;
store the images and a corresponding image privacy setting locally in the data storage of the video communication device;
display the images with the first contacts list on the electronic display; and
remove one or more of the images from being associated with first contacts of the contacts list and deleting the one or more images from its local image database stored in the data storage of the video communication device responsive to receiving instructions from the remote server indicating a change in the image privacy setting for the one or more images responsive to a user input from another user of one or more of the other video communication devices of the network.

7. The video communication device of claim 6, wherein the control circuitry is further configured to:
capture, with the image capturing device, a first image associated with the audibly impaired user; and
transmit the first image and its corresponding privacy setting to the remote server for use by at least some of the other video communication devices of the network in their local contacts lists.

8. The video communication device of claim 7, wherein the first image and the first contacts list associated with the video communication device is also shared with at least one additional video communication device that is associated with a same user account for the audibly impaired user.

9. The video communication device of claim 8, wherein at least one of the first image or the first contacts list associated with the video communication device is different than a respective image or contacts list associated with another video communication device that is associated with the same user account for the audibly impaired user.

10. The video communication device of claim 7, wherein the control circuitry is further configured to:
   capture, with the image capturing device, a second image associated with the audibly impaired user; and
   transmit the second image and its corresponding privacy setting to the remote server, wherein the privacy setting for the second image is different than the privacy setting for the first image.

11. The video communication device of claim 6, wherein the control circuitry is configured to communicate changes to the first contacts list with the remote server according to a data exchange with the remote server to reconcile a contacts database managed by the video communication device with a contacts database maintained by the remote server.

12. The video communication device of claim 11, wherein the control circuitry is configured to communicate changes to the first contacts list with the remote server according to the data exchange with the remote server to reconcile changes to the images and image privacy settings for the contacts of the first contacts list and update the corresponding data stored by the data storage device of the video communication device.

13. The video communication device of claim 12, wherein the image privacy settings for each image is selected from the group consisting of share with everyone, share with only my contacts, share with no one, and a setting requiring that the user first obtains permission from the another user to view the image.

14. The video communication device of claim 6, wherein the control circuitry is configured to manage a first contacts list for the video communication device by editing contact entries of the first contacts list, adding contact entries to the first contacts list, or removing contact entries from the first contacts list.

15. The video communication device of claim 14, wherein the control circuitry is configured to replace one or more images in the local image database responsive to receiving instructions from the remote server that a change has been made to the image associated with one of the contact entries of the first contacts list.

16. A video communication system comprising:
   video communication devices associated with audibly impaired users;
   a video relay service including one or more servers configured to:
   manage user accounts for the audibly impaired users;
   store contacts lists for each user account in a contacts lists database;
   store images and corresponding image privacy settings for each user account in an images database; and
   reconcile changes made to the images database with each of the video communication devices by:
   transmitting new or updated images to a subset of the video communication devices according to their corresponding image privacy settings for local storage and display in the contacts lists by the respective video communication devices; and
   instructing the subset of the video communication devices to delete local images stored locally by the video communication devices responsive to a change being made to their corresponding image privacy settings responsive to changes made by users of other video communication devices on their own video communication devices.

17. The video communication system of claim 16, wherein the video relay service is configured to provide translation services between a video communication device associated with an audibly impaired user and a communication device associated with an audibly capable person.

18. The video communication system of claim 16, wherein each of the video communication devices is configured to modify the image privacy settings for each image associated with its corresponding user account for the corresponding image to be updated in the contacts lists of the other video communication devices accordingly by the one or more servers.

19. The video communication system of claim 16, wherein the one or more servers are further configured to reconcile changes made to the contacts lists database for each of the video communication devices.

* * * * *